United States Patent Office 3,083,143
Patented Mar. 26, 1963

3,083,143
FLUORIDES OF ORGANIC BASES AS WELL AS OF AMPHOTERIC COMPOUNDS, A METHOD FOR THEIR PREPARATION, INCLUDING THE APPLICATION OF SUCH NEW COMPOUNDS IN THE CARIES PROPHYLAXIS, NEW DENTIFRICES AND MOUTH WASHES AS WELL AS A METHOD FOR THEIR PREPARATION
Hans Schmid, Muttenz, and Hans Rudolf Mühlemann, Zurich, Switzerland, assignors to GABA A.G., Basel, Switzerland, a Swiss company
No Drawing. Filed July 11, 1958, Ser. No. 748,570
Claims priority, application Switzerland July 13, 1957
15 Claims. (Cl. 167—93)

The invention relates to surface-active hydrofluorides of organic bases as well as to hydrofluorides of amphoteric or weakly basic non-ionogenic surface-active compounds. The invention also relates to a method of producing such hydrofluorides and to their application as caries prophylactics. Finally the invention relates to novel preparations for the care of mouth and teeth, such as dentifrices and the like.

Research in recent years has revealed that the element fluorine plays an important part in the composition of dentine and that a deficiency of this element leads to an increased tendency of the teeth to dissolve in acids thus reducing their resistance to caries. It is also known that the acids which are responsible for the slow dissolution of the dentine of the tooth are formed by bacterial activity or by the enzymatic decomposition of particles of food.

By providing a sufficiency of the element fluorine the acid solubility of the dental enamel can be significantly reduced, the introduction of the fluorine being possible prior to dentition through the medium of the blood and after dentition by external application. For the latter purpose fluorine has generally been used in the form of an inorganic compound, for instance in the form of an alkali metal, such as a fluoride of tin, as a silicofluoride or as a complex fluoride of elements of the 4th group of the periodic system (Brit. Pat. No. 644,339).

It has now been found that surface-active substances of weak to strong cationic activity containing fluorine in an ionisable bond are outstandingly suitable by external application for reducing the acid solubility of the teeth. Especially suitable compounds of this type are of the general formula

R.X.HF wherein R stands for alkyl, alkoxy, alkenyl or alkylol with 8 to 20 atoms of carbon and preferably 12–18 atoms of carbon or substituted or unsubstituted aralkyl with 8 to 20 carbon atoms and preferably 10 to 18 carbon atoms, and X is one of the following groups:

(a) $(NH_2)_y$ y being an integer from 1 to 3, (b)
$$-CO-NH.CH_2.CH_2-N\begin{matrix}R'\\ \diagdown\\ R'\end{matrix}$$

each R' being hydrogen, alkyl, alkenyl, alkylol, aralkyl or cycloalkyl, (c)
$$-N-(CH_2)_x-N\begin{matrix}R''\\ \diagdown\\ R''\end{matrix}$$
$$\;\;|$$
$$R'$$

wherein R' as well as each of the two R'' may be hydrogen, alkyl, alkoxy, alkylol, alkenyl, acyl, aralkyl or cycloalkyl, and x an integer from 1 to 3.

(d) 

wherein R' is hydrogen, alkyl, acyl, alkenyl, alkylol, aralkyl or cycloalkyl, (e)     $-CO-NH-CH_2-CHOH$
                                  $|$
                                  $R'$ wherein R' is hydrogen or a lower alkyl, and (f) 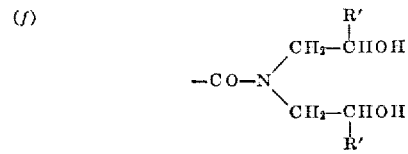

wherein each R' is hydrogen or a lower alkyl.

The hydrofluorides according to the invention are soluble in water and generally also in methanol and ethanol. The aqueous solutions foam and have a weak acid reaction. In mixture with anion-active compounds such as alkyl sulphates or alkyl-aryl sulphates mutual precipitation with the simultaneous reduction of their foam-forming ability may result.

Useful hydrofluorides having the above mentioned general formula

R.X.HF are for instance compounds of the following composition, but the invention is not to be considered as being limited to the classes herein enumerated:

(1)     $(R-(NH_2)\cdot_y HF$ wherein R is alkyl, alkoxy, alkenyl or alkylol containing 8 to 20 and preferably 12 to 18 carbon atoms or substituted or unsubstituted aralkyl with 8 to 20 carbon atoms and preferably 10 to 18 carbon atoms and both x and y are integers from 1 to 3;

(2) 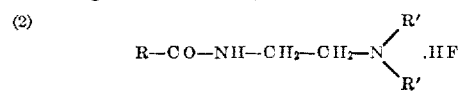

wherein R is alkyl or alkenyl containing 7 to 19 carbon atoms, and each R' is hydrogen or alkyl, alkylol, alkenyl, aralkyl or cycloalkyl;

(3) 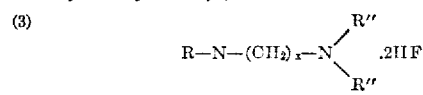

wherein R is alkyl or alkenyl with 7 to 19, preferably 11–17, carbon atoms or substituted or unsubstituted aralkyl with 8 to 20 carbon atoms and preferably 10 to 18 carbon atoms, R' and each R'' being hydrogen or alkyl, alkoxy (also in the form of ethylene oxide condensation products), alkylol, alkenyl or acyl, aralkyl or cycloalkyl, and x an integer from 1 to 3;

(4) 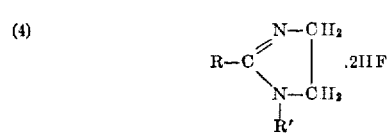

wherein R is alkyl, acyl or alkenyl with 7 to 19, preferably 11–17, carbon atoms or substituted or unsubstituted aralkyl with 8 to 20 carbon atoms and preferably 10 to 18 carbon atoms, and R' is hydrogen, or alkyl, alkoxy, acyl, alkenyl, alkylol, aralkyl or cycloalkyl; and (4a)

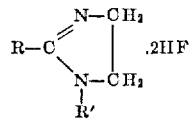

wherein R is an alkyl or alkylol radical of from 9 to 20 carbon atoms, and R' is alkyl or alkylol.

It has also been found that surface-active compounds of amphoteric character which are nevertheless capable of forming salts with hydrofluoric acid and thus exhibit cation-active properties, reduce the acid solubility of the dental enamel. For instance the fatty acid alkylol amides and fatty acid polydialkylol amides are capable of additively forming a loose bond with hydrofluoric acid. These HF addition compunds are distinguished from the basic substance without the HF by their greater solubility in water. They are soluble in methanol and ethanol. Such compounds correspond to the following general formulae:

(5)     R—CO—NH—CH$_2$—CH.OH.HF
                          |
                          R' wherein R is alkyl or alkenyl with 7 to 19, preferably 11 to 17, carbon atoms or substituted or unsubstituted aralkyl with 8 to 20 carbon atoms and preferably 10 to 18 carbon atoms, and R' is hydrogen or a lower alkyl.

(6)

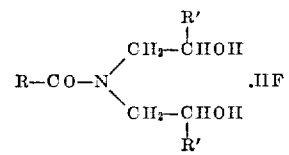

wherein R is alkyl or alkenyl with 7 to 19, preferably 11 to 17, carbon atoms or substituted or unsubstituted aralkyl with 8 to 20 carbon atoms and preferably 10 to 18 carbon atoms, and R' is hydrogen or a lower alkyl.

The novel compounds according to the invention can be prepared by reacting the bases, either dry, or in solution or suspension in suitable media such as methanol, ethanol, etc., with aqueous hydrofluoric acid or gaseous hydrogen fluoride to form salts therewith, and by then carefully evaporating the solvent (if any). The hydrofluoride is obtained in the form of a suspension it is separated by filtration. In the case of compounds which show little tendency to bind HF additively the former are briefly heated without solvent with the stoichiometric quantity of aqueous hydrofluoric acid and without removing the water an aqueous final product is obtained after cooling.

Presently-preferred groups are as hereinafter claimed; and the preparation of preferred embodiments of the invention are illustrated in the following representative examples, wherein "ml." signifies milliliters, and "g." signifies grams. Percentages are by weight.

*Example 1*

20 ml. methanol are added to
24.1 g. cetyl amine (1/10 mol) and 6.0 g. 40% hydrofluoric acid (1/10 mol+20%) are then introduced. The mixture is heated on a water bath until the amine has completely dissolved. When the solvent is evaporated a paste-like residue remains, which is briefly dried off in a vacuum at 50 to 60° C.

The acetyl amine hydrofluoride thus obtained has the formula

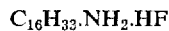

and is in the form of a colourless, crystalline powder which is greasy to the touch. It is soluble in water, methanol, and ethanol, and the aqueous solution foams.

*Example 2*

15 ml. methanol are added to
18.5 g. lauryl amine (1/10 mol). Whilst the mixture is gently stirred
6.0 g. hydrofluoric acid, 40% (1/10 mol+20%) are introduced.

The reaction mixture is heated on a water bath until dissolution is complete. Further processing is as described in Example 1. The residue is dried in the open air or in an H$_2$SO$_4$ desiccator. Lauryl amine.HF is a colourless, crystalline powder of greasy touch and has the formula $$C_{12}H_{25}NH_2.HF$$

It is soluble in water, ethanol, and methanol, and the aqueous solution foams.

Analogously to cetylamine hydrofluoride and laurylamine hydrofluoride any of the following compounds can be prepared, viz. myristylamine.HF, stearylamine.HF, decanolamine.HF, hexadecanolamine.HF, octamethylenediamine.HF or .2HF, dodecamethylenediamine.HF or 2HF, dodecylamine.HF, octadecenylamine.HF, myristoxyamine.HF, 1.6.12-triaminododecane.3HF.

*Example 3*

38.1 g. diethylamino-ethyl stearylamide (1/10 mol) are dissolved at the boil under reflux in
50 ml. ethanol. At a temperature of about 30° C.
6.0 g. hydrofluoric acid, 40%, (1/10 mol+20%) are added to the solution and the whole is then evaporated on a water bath until its consistency is paste-like. The residue is dried in the open air.

The hydrofluoride of the formula

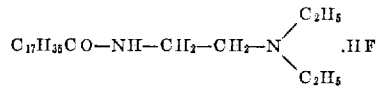

is soluble in water, ethanol and methanol. It is colourless and of waxy consistency. The aqueous solution has good foam forming properties.

*Example 4*

37.9 g. diethylamino ethyl oleylamide (1/10 mol) are dissolved in
50 ml. ethanol.
6.0 g. hydrofluoric acid, 40% (1/10 mol+20%) are added to the solution and the solvent is largely evaporated on a water bath. The remaining solvent is driven out of the oily residue in vacuo at about 50° C.

The hydrofluoride of the formula

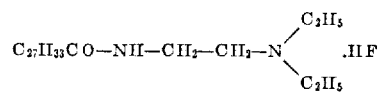

is a slightly brownish discoloured oil, soluble in water, ethanol and methanol. The aqueous solution foams.

Instead of the hydrofluorides mentioned in Examples 3 and 4 any one of the following compounds can be prepared in an analogous way, viz. diethylaminoethyl octoylamide.HF, diethanolamino-ethyl stearoylamide.HF, dodecanolamino-ethyl oleylamide.HF, oleylamino-ethyl myristylamide.HF, di-isopropylamino-ethyl lauroylamide.HF.

*Example 5*

15 ml. water and then
10 g. hydrofluoric acid, 40% (2/10 mol) are added to
44.4 g. diethanolaminopropyl-N'-ethanol-octadecylamine (1/10 mol). The paste-like reaction compound is kneaded until homogeneous and then dried over desiccating agents or in the open air.

The resultant hydrofluoride of the formula

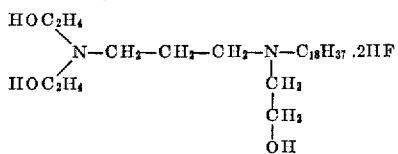

is soluble in water, ethanol, and methanol. The aqueous solution foams.

Analogously any one of the following hydrofluorides can be prepared, viz. diethanolamino-ethyl-N'-ethanol octadecenylamine.2HF, diethanolamino-propyl - N' - ethanol-octylamine, di - isopropanolamino-ethyl - N' - methyl laurylamine.2HF, oleylamino-ethyl-N'-isopropyl myristyl-amine.2HF.

The corresponding acylamino compounds may be obtained according to conventional methods e.g. by acylating or benzoylating of the corresponding amines with fatty acid anhydrides or fatty acid halides. In this way for instance acetylamino-ethyl-N'-ethyl-octadecylamine.HF can be prepared.

*Example 6*

43.8 g. (½₀ mol) of N-dialkoxy-N'-alkoxydodecyl propylene diamine of the formula:

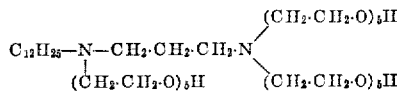

are dissolved in 200 g. of methanol and to the resultant solution is added 2.95 g. of aqueous hydrofluoric acid, 38%, i.e. ½₀ mol thereof plus an excess amount of 10 percent. The solvent is then distilled off from the reaction solution and the residue dried in vacuo.

In an analogous way also lower and higher alkoxy condensation products can be prepared instead of the above alkoxy derivative.

*Example 7*

10 ml. water are added to
37.8 g. 1-ethanol-2-oleylimidazoline (⅒ mol).
10.0 g. hydrofluoric acid, 40% (²⁄₁₀ mol) are then added progressively. The initially oily base stiffens as salt formation proceeds under heat. The crumbly mass is kneaded to homogeneity. Drying can be performed in a sulphuric acid desiccator or in the open air.
The hydrofluoride of the formula

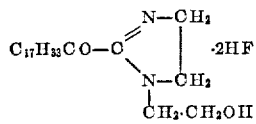

is soluble in water, ethanol and methanol. The aqueous solution foams.

Analogously the following hydrofluorides can be prepared as described in Example 6, viz. 1-ethanol-2-heptadecylimidazoline.2HF, 1-ethyl-2-pentadecenyl-imidazoline.2HF, 1-isopropanol-2-tridecyl-imidazoline.2HF, 1-methyl-2-undecylimidazoline.2HF, 1-dodecyl-2-nonylimidazoline.2HF, 2-heptadecenylimidazoline.2HF, 1-oleyl-2-octadecylimidazoline.HF, 1-acetyl-2-dodecylimidazoline.HF, 1-aethyl-2-undecoxy-imidazoline.2HF.

*Example 8*

30.2 g. lauroyl-diethanolamide, 95%, (⅒ mol) are heated on a water bath and
5.0 g. hydrofluoric acid, 40% (⅒ mol) are added thereto.
Heating is continued for a short time until a homogeneous melt is obtained which is then allowed to cool. The hydrofluoride of the formula

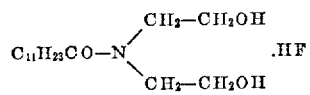

remains as a colourless slightly yellowish paste. It is soluble in water, ethanol, and methanol. The aqueous solution foams.

Analogously, the following hydrofluorides can be prepared, viz. octoyl ethanolamide.HF, lauroyl isopropanolamide.HF, palmitoyl ethanolamide.HF, oleyl ethanolamide.HF, oleyl monoisopropanolamide.HF, stearoyl diisopropanolamide.HF, myristoyl diethanolamide.HF.

In a similar way as that described in the above examples anyone of the following compounds can for instance be produced, namely co-phenyl decylamine.HF, co-toluyl octadecylamine.HF, stearoyl aminoethyl dibenzylamine.HF, lauroyl aminoethyl furfurylamine.HF, N-octadecenyl-N-(ethylol)-N'-phenylethyl propylene diamine.2HF, N-dodecyl-N'-cyclohexyl ethylene diamine.2HF, 1-benzyl-2-dodecyl imidazoline.2HF, 1-ethylol-2-(phenyl hexadecyl)-imidazoline.2HF, co-phenyl stearoyl ethanolamide.HF, co-phenylmyristoyl diethanolamide.HF and the like.

The efficacy of the novel compounds according to the invention in inhibiting the solubility of dental enamel was established by the following tests.

The roots as well as any spots affected by caries of otherwise sound teeth (molars and pre-molars) were covered with wax. Having been thus prepared the teeth were immersed for 20 hours in the active substance which it was desired to test at a pH of 2.9. The latter had a fluorine concentration of 0.1% F. The surface of the teeth was well rinsed in distilled water and then decalcified in a phthalate buffer solution having a pH of 4.0. This was performed whilst shaking for 3 hours at 37° C. The calcium and phosphorus dissolved out of the teeth was quantitatively determined in the decalcifying solution. The calcium determination was complexometrically performed by Schwarzenbach's method, and the phosphorus was determined colormetrically according to Fiske and Subbarow. The results provided a direct measure of the solubility of the enamel and hence of the efficacy of the tested substance. Sodium chloride was used as a reference substance without protective effect. The results were therefore all referred to this substance. A series of comparative tests performed as described with NaCl and the substances enumerated in Examples 1 to 8 disclosed decreases of solubility of the enamel as set forth in the following table.

|  | In percent for calcium | In percent for phosphorus |
|---|---|---|
| NaCl | 0 | 0 |
| Substance Example: |  |  |
| 1 | 90 | 93 |
| 2 | 86 | 89 |
| 3 | 72 | 69 |
| 4 | 61 | 66 |
| 5 | 83 | 84 |
| 6 | 86 | 85 |
| 7 | 74 | 83 |

Apart from the mentioned novel active substances, preparations according to the invention for the care of teeth may contain the usual abrasives, such as calcium phosphate, calcium carbonate, magnesium carbonate, calcium sulphate, insoluble precipitated alkaline earth fluorides, kaolins, bolus, etc. However, it has been found that, owing to the presence of these ingredients, some of the fluorine is prevented from taking the desired effect by forming insoluble alkaline earth fluorides or by being retained by adsorption.

It was further found that the oxides, ortho- and pyrophosphates, of tin and zinc are outstandingly useful abrasives in dentrifices.

The present invention therefore also relates quite generally to preparations for the care of the teeth which, in addition to the conventional ingredients, contain an oxide, an ortho-, or pyrophosphate, of tin or zinc. Since it was found that the oxides, the ortho- and pyrophosphates, of tin and zinc, leave a much larger quantity of the fluorine available in reactive form, the above mentioned oxides and/or phosphates are particularly suitable for incorporation in any fluorine-containing dental preparation which contains one of the fluorine compounds previously proposed. However, the said oxides and/or phosphates are particularly suitable as additives to the novel fluorine compounds proposed by the invention and in combination with them their effect for the conservation of teeth is excellent.

Furthermore, the dental preparations according to the invention may contain additional surface-active substances with a foaming and wetting action, as well as aroma-providing agents and flavours. With reference to the first group, care must be taken to see that a combination with anion-active substances does not significantly reduce the effect of the cation-active substances proposed by the invention. It is therefore preferred to use wetting and foaming agents exhibiting no ionogenic activity.

In paste-like preparations mucilages and swelling agents of an organic or inorganic nature as well as softeners, such as glycerine, sorbitol syrup, glucose syrup, may be incorporated. In the selection of suitable mucilages it has been found that a large number of cation-active reagent containing the usual mucilage-forming ingredients, such as tragacanth, alginate, carboxymethylcellulose, carrageen, are incompatible to a more or less marked degree. It is preferred to use mucilages prepared from the seed kernels of fruits, cellulose ethers or the like.

Liquid dental preparations consist of an aqueous or principally aqueous-alcoholic solution of the compounds proposed by the invention with the usual additives, such as flavours, aromatic agents, non-ionogenic emulsifiers, and wetting agents, glycerine, sorbitol syrup, and drug extracts, to the extent they are compatible.

A number of exemplary dentifrices, such as tooth-pastes and powders, and mouth washes are given hereunder by way of non-limiting illustrations ("corr."=corresponding to):

*Example 9*

A toothpaste may have the following composition:

| | Percent |
|---|---|
| Zinc ortho-phosphate | 35.0 |
| Sorbitol syrup | 15.0 |
| Powdered fruit kernels | 1.0 |
| Aroma (oil of wintergreen) | 1.0 |
| Cetyl amine hydrofluoride | 1.37 corr. 0.1% F. |
| Water | 46.63 |

*Example 10*

A dentifrice may have the following composition:

| | Percent |
|---|---|
| Tin (IV) oxide | 40.0 |
| Glycerine | 12.0 |
| Methyl cellulose | 1.0 |
| Aroma (oil of peppermint) | 1.0 |
| 1-ethoxy-2-oleylimidazoline hydrofluoride | 1.1 corr. 0.1% F. |
| Water | 44.9 |

*Example 11*

| | Percent |
|---|---|
| Slurry of powdered fruit kernels | 60.0 |
| Titanium dioxide | 1.0 |
| Glycerine | 12.0 |
| Saccharine | 0.1 |
| Aroma (oil of peppermint) | 1.5 |
| Diethanolamino-propyl-N'-ethanol octadecylamine dihydrofluoride (5.5% of fluorine) | 3.6 corr. 0.2% F. |
| Water | 21.8 |

The pH values of the aforementioned pastes should be within the range 3.5 to 7, preferably between 3.8 to 5.5. The proportion of active substance, calculated as fluorine, should be 0.01 to 4%, preferably between 0.05 to 1%. The powdered fruit kernels or cellulose ethers are dissolved in part of the water to form a mucilage and the active reagent dissolved in the remainder of the water is then added. Finally, the glycerine, aroma, abrasive, and possibly the wetting and/or foaming agent, are incorporated. The mixture is thoroughly mixed in a suitable mixing machine and if necessary homogenised in a rolling or colloid mill.

*Example 12*

For instance, a mouth wash may have the following composition:

| | Percent |
|---|---|
| Ethyl alcohol | 58.8 |
| Glycerine | 15.0 |
| Aroma (oil of wintergreen) | 5.0 |
| Diethylamino ethyl stearylamide hydrofluoride | 21.2 corr. with 1% F. |

Before use the preparation is considerably diluted, for instance in the proportion of 2 ml. per 50 ml. of water, so that the concentration in application is 0.04% F.

The active agent is dissolved in the ethyl alcohol with the application of heat, the aroma and glycerine being added after the solution has cooled.

*Example 13*

A tooth powder may have the following composition:

| | Percent |
|---|---|
| Zinc pyrophosphate | 95.4 |
| Lauryl amine hydrofluoride | 1.1 corr. with 0.1% F. |
| Aroma (oil of peppermint) | 1.0 |
| Non-ionogenic emulsifier, viz. polyoxyethylene sorbitane monostearate | 2.5 |

The finely powdered dry ingredients are well mixed in a suitable mixer and the aroma component is slowly added during the mixing process.

The active compounds employed in the above Examples 9 to 13 be replaced by others of the general formula

R.X.HF

Moreover, the fillers and carrier materials, abrasives, emulsifiers, solvents, and so forth, may be varied as desired and suitable other fluorine compounds according to the invention substituted for those mentioned above to prepare tooth pastes, mouth washes, and tooth powders of other compositions.

The mouth washes and dentifrices according to the invention may alternatively be prepared by performing the reaction of the hydrofluoric acid with the base components in the course of preparation of the dentifrices and so forth, principally in the case of the pastes and washes. To this end the base component is dissolved or suspended in part of the liquid ingredients, heated if necessary, and reacted by the careful addition of aqueous hydrofluoric acid to the cation-active compound. The remaining ingredients are added subsequently.

The method may be illustrated by the following non-limiting examples.

*Example 14*

A tooth paste:

| | Percent |
|---|---|
| Zinc ortho-phosphate | 40.0 |
| Glycerine | 15.0 |
| Powdered fruit kernels | 1.0 |
| Aroma (oil of wintergreen) | 1.5 |
| Diethyl amino ethyl oleylamide | 3.1 |
| Hydrofluoric acid, 20% | 0.8 |
| Water | 38.6 |

The base is dispersed in half the total quantity of water and the hydrofluoric acid is added slowly while the suspension is stirred. To complete the reaction the temperature is subsequently raised to 60° C. After the solution has cooled the mucilage is incorporated. The latter is prepared by dissolving the powdered fruit kernels in the rest of the water. The glycerine and the aroma are then added and finally the zinc ortho-phosphate is incorporated whilst the mixture is continuously stirred. It is preferable to homogenise the paste in a homogenising mill.

*Example 15*

A mouth wash:

| | Percent |
|---|---|
| Dodecanol amine | 15.85 |
| Ethyl alcohol | 68.99 |
| Hydrofluoric acid, 40% | 3.95 |
| Aroma (oil of wintergreen) | 1.20 |
| Sweetening agent (saccharine) | 0.01 |
| Water | 10.0 |

With the application of a little heat the amine is dissolved in the ethyl alcohol. The hydrofluoric acid is added slowly when the solution has cooled whilst stirring. The mixture heats up and when it has cooled again the aroma and then the water and the sweetening agent are added.

The concentration of active agent in the preparation is equivalent to 1.5% fluorine. The preparation is considerably diluted before use, for instance by the addition of 50 ml. water per each ml. preparation, so that the F concentration for application is 0.03%.

It will be understood that the aroma ingredients, sweetening agents, flavoring agents, etc. may be varied as desired, these being essentially conventional per se.

Having thus disclosed the invention, what is claimed is:

1. A method of reducing the acid solubility of teeth which comprises applying thereto a surface-active hydrofluoride of a cationic organic amine.

2. A dentifrice composition comprising a caries prophylactic and an abrasive wherein (A) the caries prophylactic is a surface active organic amine hydrofluoride selected from the group consisting of those of the formulae:

(I)　　R·(NH$_2$)$_y$·$x$HF

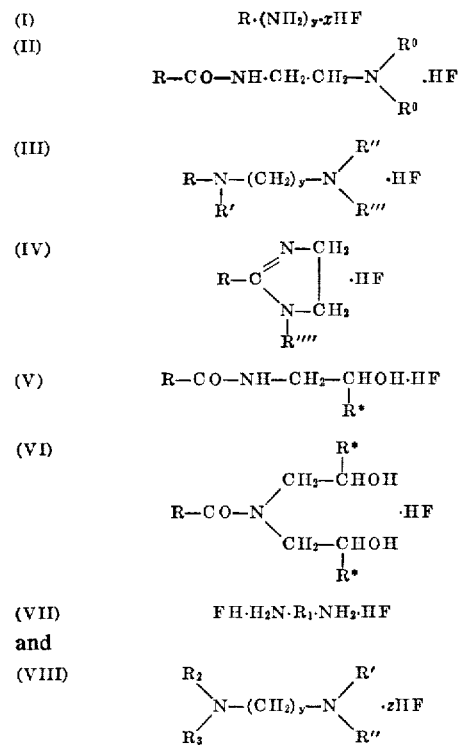

(VII)　　FH·H$_2$N·R$_1$·NH$_2$·HF and (VIII)

wherein

R is a member selected from the group consisting of alkyl, alkoxy, alkenyl, alkylol and aralkyl radicals of from about 8 to about 20 carbon atoms;

$x$ is a positive integer of at most three;

$y$ is a positive integer of at most three;

R$^0$ is a member selected from the group consisting of hydrogen, alkyl, alkenyl, alkylol, aralkyl and cycloalkyl radicals;

each of R', R" and R'" is a member selected from the group consisting of hydrogen, alkyl, alkoxy, alkylol, alkenyl, acyl, aralkyl and cycloalkly radicals;

R"" is a member selected from the group consisting of hydrogen, alkyl, acyl, alkenyl, alkylol, aralkyl and cycloalkyl radicals;

R* is a member selected from the group consisting of hydrogen and lower alkyl radicals;

R$_1$ is an alkylene radical of from about 8 to about 20 carbon atoms;

R$_2$ is a member selected from the group consisting of alkyl and alkenyl radicals of from about 8 to about 20 carbon atoms;

R$_3$ is a member selected from the group consisting of alkyl, alkoxy, acyl, alkenyl, alkylol, aralkyl and cycloalkyl radicals; and $z$ is a positive integer of at most two; and (B) the abrasive leaves a substantial quantity of the fluorine available in reactive form.

3. A dentifrice composition comprising a caries prophylactic and an abrasive wherein (A) the caries prophylactic of the formula

R·NH$_2$·HF wherein R is an alkyl radical of from about 8 to about 20 carbon atoms and (B) the abrasive leaves a substantial quantity of the fluorine available in reactive form.

4. A dentifrice composition comprising a caries prophylactic and an abrasive wherein (A) the caries prophylactic is an amine hydrofluoride of the formula

R·NH$_2$·HF wherein R is an alkylol radical of from about 8 to about 20 carbon atoms and (B) the abrasive leaves a substantial quantity of the fluorine available in reactive form.

5. A dentifrice composition comprising a caries prophylactic and an abrasive wherein (A) the caries prophylactic is an amine hydrofluoride of the formula

FH·H$_2$N·R·NH$_2$·HF wherein R is an alkylene radical of from about 8 to about 20 carbon atoms and (B) the abrasive leaves a substantial quantity of the fluorine available in reactive form.

6. A dentifrice composition comprising a caries prophylactic and an abrasive wherein (A) the caries prophylactic is an amine hydrofluoride of the formula

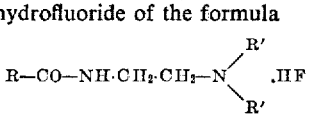

wherein R is a member selected from the group consisting of alkyl and alkenyl radicals of from about 7 to about 19 carbon atoms, and R' is a member selected from the group consisting of hydrogen, lower alkyl, alkenyl, alkylol, aralkyl and cycloalkyl radicals; and (B) the abrasive leaves a substantial quantity of the fluorine available in reactive form.

7. A dentifrice composition comprising a caries prophylactic and an abrasive wherein (A) the caries prophylactic is an amine hydrofluoride of the formula

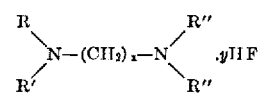

wherein R is a member selected from the group consisting of alkyl and alkenyl radicals of from about 8 to about 20 carbon atoms; R' is a member selected from the group consisting of alkyl, alkoxy, acyl, alkenyl, alkylol, aralkyl and cycloalkyl radicals; each R" is a member selected from the group consisting of hydrogen, alkyl, alkoxy, acyl, alkenyl, alkylol, aralkyl and cycloalkyl radicals; $x$ is a positive integer of at most 3; and $y$ is a positive integer of at most 2; and (B) the abrasive leaves a substantial quantity of the fluorine available in reactive form.

8. A dentifrice composition comprising a caries prophylactic and an abrasive wherein (A) the caries prophylactic is diethanolaminopropyl - N' - ethanol - octadecylamine · dihydrofluoride and (B) the abrasive leaves a substantial quantity of the fluoride available in reactive form.

9. A dentifrice composition comprising a caries prophylactic and an abrasive wherein (A) the caries prophylactic is cetyl amine hydrofluoride and (B) the abrasive leaves a substantial quantity of the fluoride available in reactive form.

10. A dentifrice composition comprising a caries prophylactic and an abrasive wherein (A) the caries prophylactic is 1-ethoxy-2-oleylimidazoline hydrofluoride and (B) the abrasive leaves a substantial quantity of the fluoride available in reactive form.

11. A dentifrice composition comprising a caries prophylactic and an abrasive wherein (A) the caries prophylactic is lauryl amine hydrofluoride and (B) the abrasive leaves a substantial quantity of the fluoride available in reactive form.

12. A dentifrice composition comprising a caries prophylactic and an abrasive wherein (A) the caries prophylactic is diethyl amino ethyl oleylamide hydrofluoride and (B) the abrasive leaves a substantial quantity of the fluoride available in reactive form.

13. A dentifrice composition comprising a caries prophylactic and an abrasive wherein (A) the caries prophylactic is an amine hydrofluoride of the formula $$R \cdot NH_2 \cdot HF$$

wherein R is an alkylol radical of from about 10 to about 16 carbon atoms and (B) the abrasive leaves a substantial quantity of the fluorine available in reactive form.

14. A dentifrice composition comprising a caries prophylactic and an abrasive wherein (A) the caries prophylactic is a surface active organic amine hydrofluoride of the formula $$R \cdot NH_2 \cdot HF$$

wherein R is an alkenyl radical of from about 8 to about 20 carbon atoms and (B) the abrasive leaves a substantial quantity of the fluorine available in reactive form.

15. A dentifrice composition comprising a caries prophylactic and an abrasive wherein (A) the caries prophylactic is an amine hydrofluoride of the formula

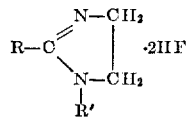

wherein R is a member selected from the group consisting of alkyl and alkylol radicals of from about 9 to about 20 carbon atoms and R' is a member selected from the group consisting of alkyl and alkylol and (B) the abrasive leaves a substantial quantity of the fluorine available in reactive form.

References Cited in the file of this patent

UNITED STATES PATENTS

| | | |
|---|---|---|
| 2,166,119 | Bousquet | July 18, 1939 |
| 2,166,120 | Bousquet | July 18, 1939 |
| 2,228,985 | De Groote | Jan. 14, 1941 |
| 2,228,987 | De Groote | Jan. 14, 1941 |
| 2,238,069 | Miller | Apr. 15, 1941 |
| 2,246,524 | Kyrides | June 24, 1941 |
| 2,361,524 | Allardt | Oct. 31, 1944 |
| 2,362,614 | Calva | Nov. 14, 1944 |
| 2,472,361 | Arsem | June 7, 1949 |
| 2,541,088 | Nikowitz | Feb. 13, 1951 |
| 2,565,189 | Wernlund | Aug. 21, 1951 |
| 2,590,073 | Albrecht | Mar. 25, 1952 |
| 2,644,826 | Spivak | July 7, 1953 |
| 2,680,137 | Pickett | June 1, 1954 |
| 2,692,264 | Wojcik | Oct. 19, 1954 |
| 2,749,278 | Moss | June 5, 1956 |
| 2,792,404 | Garmaise | May 14, 1957 |
| 2,813,102 | Winthrop | Nov. 12, 1957 |
| 2,818,371 | Wessinger | Dec. 31, 1957 |
| 2,820,801 | De Benneville | Jan. 21, 1958 |

FOREIGN PATENTS

| | | |
|---|---|---|
| 207,489 | Australia | Apr. 17, 1957 |
| 543,066 | Canada | July 2, 1957 |

UNITED STATES PATENT OFFICE
CERTIFICATE OF CORRECTION

Patent No. 3,083,143                           March 26, 1963

Hans Schmid et al.

It is hereby certified that error appears in the above numbered patent requiring correction and that the said Letters Patent should read as corrected below.

Column 1, line 38, after "of" insert -- a fluoride of --; column 2, lines 3 to 7, the formula should appear as shown below instead of as in the patent:

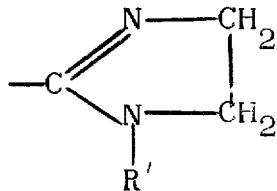

same column 2, line 36, the formula should appear as shown below instead of as in the patent:

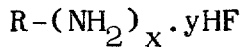

column 4, lines 55 to 58, the formula should appear as shown below instead of as in the patent:

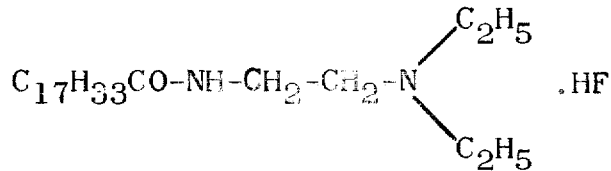

column 10, line 23, after "prophylactic" insert -- is an amine hydrofluoride --.

Signed and sealed this 24th day of December 1963.

(SEAL)
Attest:
ERNEST W. SWIDER

Attesting Officer

EDWIN L. REYNOLDS
Acting Commissioner of
Patents

UNITED STATES PATENT OFFICE

CERTIFICATE OF CORRECTION

Patent No. 3,083,143            March 26, 1963

Hans Schmid et al.

It is hereby certified that error appears in the above numbered patent requiring correction and that the said Letters Patent should read as corrected below.

Column 1, line 38, after "of" insert -- a fluoride of --; column 2, lines 3 to 7, the formula should appear as shown below instead of as in the patent:

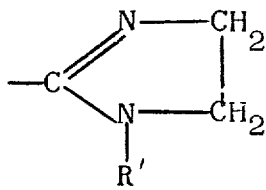

same column 2, line 36, the formula should appear as shown below instead of as in the patent:

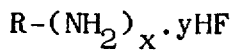

column 4, lines 55 to 58, the formula should appear as shown below instead of as in the patent:

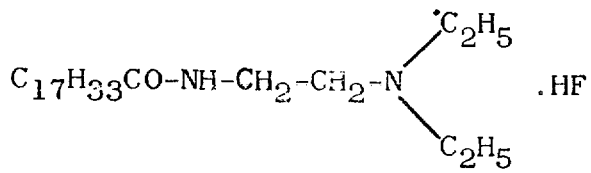

column 10, line 23, after "prophylactic" insert -- is an amine hydrofluoride --.

Signed and sealed this 24th day of December 1963.

(SEAL)
Attest:
ERNEST W. SWIDER

Attesting Officer

EDWIN L. REYNOLDS
Acting Commissioner of
Patents